No. 877,681. PATENTED JAN. 28, 1908.
C. E. THORP.
VEHICLE.
APPLICATION FILED SEPT. 19, 1906.
2 SHEETS—SHEET 1.
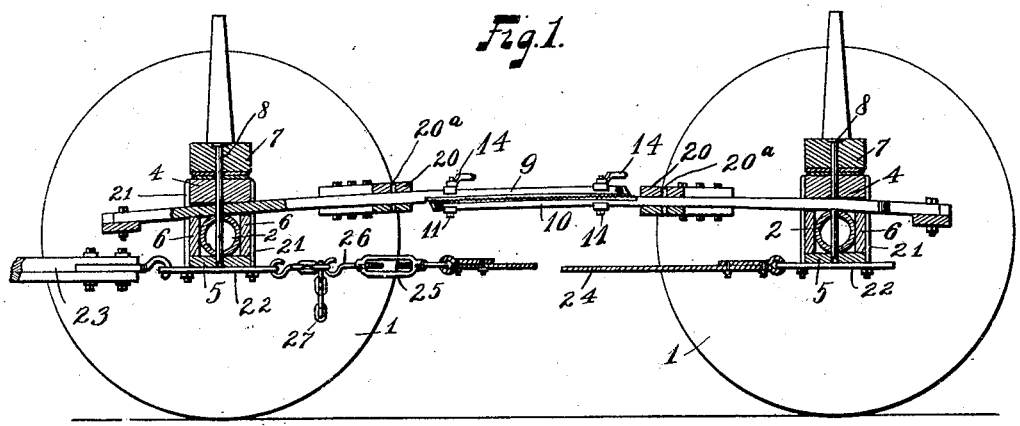
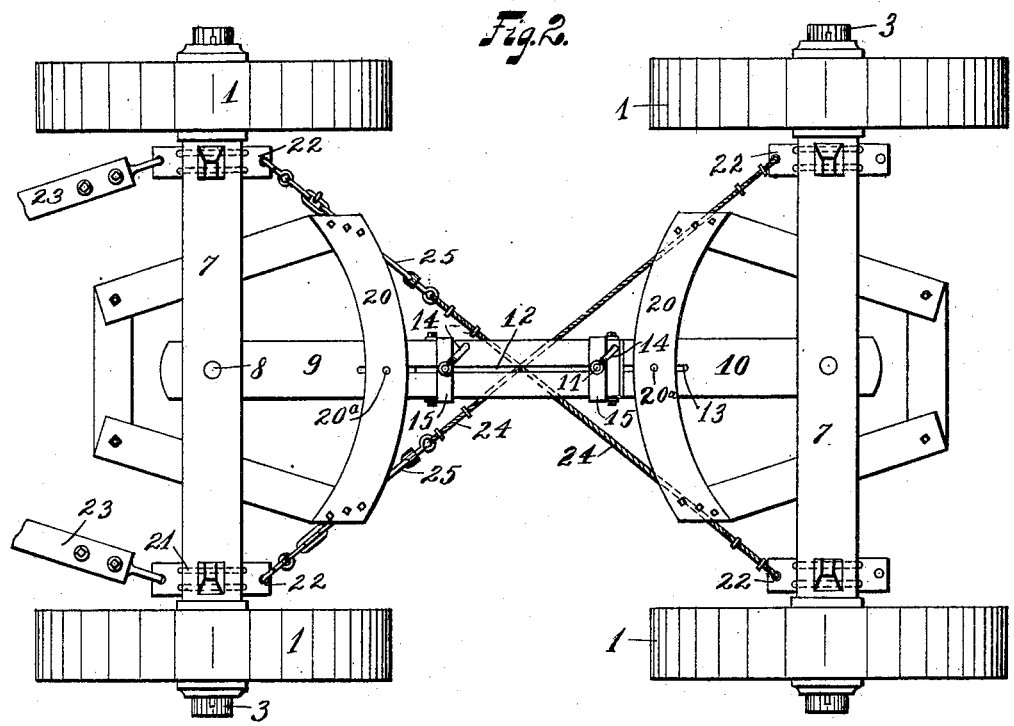
Witnesses:
Inventor,
Charles E. Thorp
by Bates, Fouts & Hull
Attorneys.

No. 877,681. PATENTED JAN. 28, 1908.
C. E. THORP.
VEHICLE.
APPLICATION FILED SEPT. 19, 1906.

2 SHEETS—SHEET 2.

WITNESSES:
Brennan B. West.
W. L. McGarrell.

INVENTOR,
Charles E. Thorp
BY
Bates, Fouts & Hull
ATTYS.

THE NORRIS PETERS CO., WASHINGTON, D. C.

UNITED STATES PATENT OFFICE.

CHARLES E. THORP, OF CLEVELAND, OHIO.

VEHICLE.

No. 877,681.  Specification of Letters Patent.  Patented Jan. 28, 1908.

Application filed September 19, 1906. Serial No. 335,203.

*To all whom it may concern:*

Be it known that I, CHARLES E. THORP, a citizen of the United States, residing at Cleveland, in the county of Cuyahoga and State of Ohio, have invented a certain new and useful Improvement in Vehicles, of which the following is a full, clear, and exact description, reference being had to the accompanying drawings.

This invention relates to vehicles and particularly to that class of vehicles known as log or lumber wagons, said invention having for its object the production of wagons of this character which will be simple and economical in construction, which will be adjustable as to the distances between the axles, which can be turned in a short radius, and which, when adjusted, will prevent all looseness or lost motion between the parts.

Figure 3:
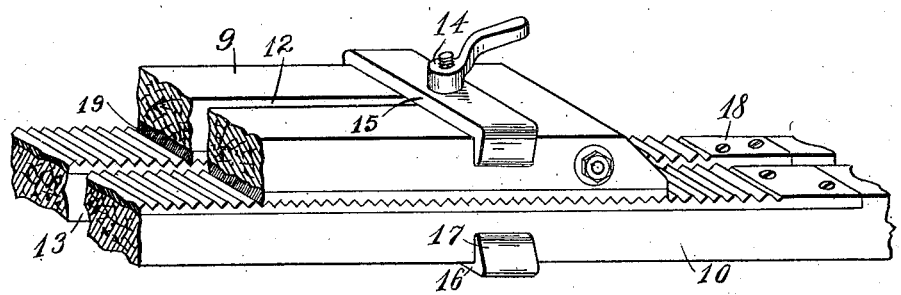
Figure 4:
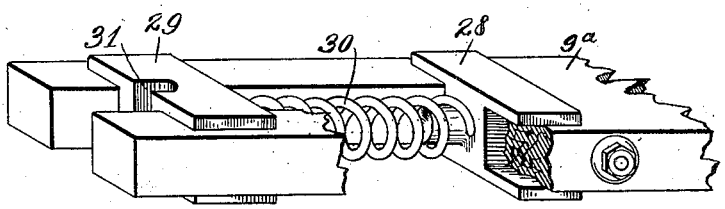
Figure 5:
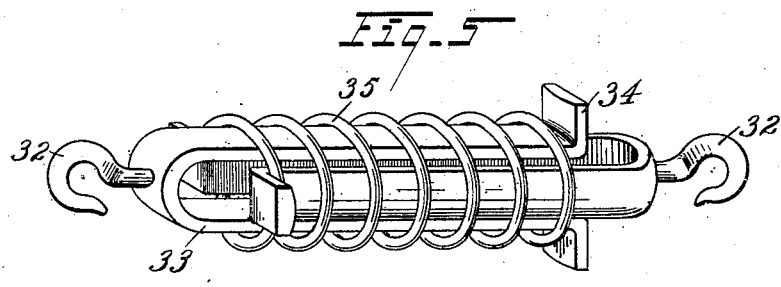
Figure 6:
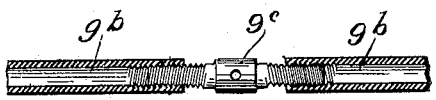

In the drawings forming part of the application, Figure 1 is a longitudinal section through the vehicle, showing the means for adjusting the length of the reach, and for tightening the steering cables. Fig. 2 is a plan view of a wagon having my invention applied thereto. Fig. 3 is a detail perspective view of the two sections of the reach, showing means for holding said sections together, and for preventing slippage between them. Fig. 4 is a detail perspective view of a modified form of reach. Fig. 5 is a perspective view of a spring device that is adapted to be inserted in the steering cables, when it might become necessary or advisable to use a rigid steel or truss reach, thus forming another modification of my invention; and Fig. 6 shows an adjustable form of reach for tensioning the connections between the axles.

My invention is particularly applicable to wagons which are adapted for hauling very heavy loads over rough or uneven ground, or where sharp turns must necessarily be made. For turning the sharp corners in the roads, both of the axles of the vehicle are adapted to be swung, the two axles being connected together by cross cables, whereby when the front axle is swung in one direction, the rear axle will be turned in the opposite direction, thus making it possible to turn the wagon or vehicle upon a short radius, the rear wheels following the tracks made by the front wheels. This construction is also desirable for the reason that, when one axle is turned it must necessarily compel a corresponding movement in the other axle, thus giving a steadiness in the operation of the vehicle that is not possible in the ordinary form of wagon. In order to secure the best results from this construction, however, it is necessary for the cross steering cables to be so much tightened as to place the connections between the axles under a yielding stress, in which case any stretching or loosening of the cables will be immediately taken up by the resiliency provided for in said connections.

Taking up the drawings for a detailed description, 1 represents the wheels of a log or lumber wagon, said wheels being journaled upon the ends of axles 2. These axles are preferably formed of an iron pipe 3, extending from wheel to wheel and forming the spindles for the axle, around which pipe I build a frame work or box consisting of an upper member 4, a lower member 5, and side members 6. Mounted upon the upper member 4 is the bolster 7, which is connected to the axle by the king-pin 8, in the usual manner.

Extending from axle to axle of the vehicle, and being held in place by the king-pins 8 which pass therethrough, is a reach that is composed of the members 9 and 10. These members are made to overlap each other, preferably midway between the axles, and are held together by means of bolts 11, which pass through slots 12 and 13 in the members 9 and 10, respectively. These bolts are each provided with a nut 14 having a handle or crank by means of which the nut may be tightened. In order to prevent the members of the reach from slipping laterally or from splitting, plates 15 and 16 are provided, said plates overlapping the edges of the members of the reach and having flanges 17 extending at right angles to the plates so as to embrace the edges of the said members. Upon the adjacent faces of the members 9 and 10 of the reach, I secure corrugated or serrated plates 18 and 19, the corrugations in said plates fitting into each other so as to prevent all slipping of the members of the reach after the nuts 14 have been tightened, thus forming an absolutely self-locking, adjustable reach.

The hounds of the wagon are shown at 20, said hounds passing through the frame work of the axle, and passing upon opposite sides of the reach.

The members 4, 5, and 6 forming the frame about the axle are held together by means of U-shaped clips 21, which are passed downwardly over said members and through plates 22 below the axle, said plates extending both in front and in rear of said axle, said extensions forming means for attaching the tongue or draft 23, and the steering cables 24. The plates 22 are placed at each end of each of the axles, and the plates on each axle are adapted to receive the tongue or draft, so that the vehicle is capable of being drawn in either direction; or, a number of said vehicles may be attached together in a train, the steering mechanism described affording all the advantages as to reversible draft that is found in railway cars. As stated, the plates 22 also form means of attachment for the steering cables 24. These cables are provided with turn-buckles 25, by means of which they may be put under high tension, thus securing an absolute adjustment to keep the wagon in track and to preserve a balanced draft.

It will be noticed that the steering cables are attached to the plates 22 in a plane below the axis of the vehicle, while the reach lies in a plane above the center of the axle. The reach having been adjusted to the desired length, by loosening the nuts 14 and sliding the members of the reach upon each other to the necessary extent, the nuts are again tightened, the steering cables are adjusted by the hooks 26, connected with the turn-buckles, said hooks being engaged with links 27 in a chain which is connected to the plate 22, on one of the axles. The steering cables having been thus roughly adjusted in length, they are put under a high tension by means of the turn-buckles 25, with the result that the lower parts of the axles are drawn toward each other and the reach is cambered or bent upwardly in the shape of a bow, as shown in Fig. 1. The cambering of the reach is greatly facilitated by the hounds, which, passing through the frame work of the axle, lift against the reach at points some distance from their respective axles. In a wagon of the size in which I contemplate using this device, the members of the reach are made very large and strong, so that it requires a tremendous tension upon the steering cables before the reach is cambered in the manner shown. When in this condition, the parts are under very great stress and all looseness or lost motion between the axles is taken up. The draft being applied to the plates 22, it will be transmitted from the front axle directly to the rear through the steering cables; and the reach, instead of being put under tension, as in the ordinary form of vehicle, is constantly under compression, the entire draft of the rear wheels being sustained by the cables 24. Furthermore, the draft being applied below the center of the axles tends to rock the front axle about its center and to thereby straighten the reach, with the result that the cables are put under a still higher tension, which would not be the case if the draft were applied above or at the center of the axles. The slightest turning movement given to the front axle will be transmitted fully to the rear axle—this movement of both axles effectually preventing the whipping of the tongue of the vehicle, as occurs in vehicles of the ordinary construction when one of the front wheels strikes an obstruction.

In Fig. 4, I have shown a modified form of the reach, one end of the same being illustrated. As shown, this end, 9$^a$, of the reach is slotted at the center to receive sliding blocks 28 and 29, said blocks being separated by means of a coiled spring 30, said spring bearing against the adjacent faces of said blocks. The block 29 is provided on its outer face with a groove or notch 31 which is adapted to engage against the king-pin 8 in the axle. In assembling this form of reach, the same is inserted in position with the king-pin 8 in the notch 31, and the steering cables are then taken up by means of the chain and hook shown. By tightening the turn buckle 25, stress is applied to the reach, which compresses the spring 30 between the blocks 28 and 29, and thus puts the connections between the axles under a high stress, such as was secured by bowing the reach in the form first described. The same yielding stress in the connections may be secured by means of the device shown in Fig. 5, one of which is intended to be inserted in each of the steering cables, intermediate their ends, the adjacent ends of the steering cables being attached to the hooks 32. These hooks are attached to U-shaped members 33, said members being turned outwardly at 34 at their ends opposite the hooks. A coil spring 35 surrounds these members, said spring being placed under stress whenever the hooks 32 are pulled apart. By placing this device in each of the steering cables, and then tightening the cables by means of the turn-buckles, the springs 35 are compressed, and the connections between the axles is put under a high but yielding stress, as in the forms previously described.

In Figs. 1 and 2 I have shown a hole 20$^a$ through the hounds, into which I may insert a pin extending through the reach. When this is done at one end of the wagon and the steering cables are removed, the wagon conforms to the ordinary type, as will be understood.

Some of the advantages of my invention may be secured by inserting a right and left-handed screw in the reach, whereby the connections between the axles may be put under stress. This construction is illustrated in Fig. 6, in which 9$^b$ are sections of the reach, and 9$^c$ is the right and left-handed screw that enters the said sections. By turning the said screw the reach may be lengthened as desired, and the steering cables thus put under tension. In such case, however, the steering cables cannot be separately adjusted, which is very desirable in order to cause the wheels to track properly.

While I have shown my invention as applied to a log wagon, it will be obvious that it is capable of application to vehicles generally. In fact, it is especially useful when applied to vehicles for use in cities where it is often necessary to drive into narrow alleys. In using the ordinary vehicles the front wheels may enter the alleys, but, as the rear wheels do not follow the front wheels in turning corners, it is often difficult to get the entire vehicle in the alleys. As the rear wheels follow the front wheels in my invention, this trouble is avoided.

While I have shown and described constructions of vehicles for securing the advantages to a greater or less degree of my invention, I desire it to be understood that I do not limit the following claims any further than is made necessary by their express terms or by the prior state of the art.

Having thus described my invention, I claim:

1. In a vehicle, a pair of axles, connections between said axles, said connections comprising diagonal steering members and a yielding reach and turn buckles in said members for placing said connections under stress and for adjusting the tension thereof for the purpose specified.

2. In a vehicle, a pair of axles, connections between said axles, said connections comprising diagonal steering cables and a yielding reach, and means for placing said connections under stress whereby the reach is bowed and all looseness or lost motion between the axles is prevented.

3. In a vehicle, a pair of axles, a reach connecting said axles, said reach being composed of two members that are provided with corrugations or serrations on their adjacent faces, means for holding said members in their engaging position, diagonal steering means connecting said axles, means whereby said cables may be adjusted to conform to the length of the reach, and means connected with said cables for tightening the latter whereby the connections between the axles are put under a yielding stress, for the purpose specified.

4. In a vehicle, a pair of axles, a yielding reach connecting said axles, said reach being composed of two members that are provided with corrugations or serrations on their adjacent faces, means for holding said members in their engaging position, diagonal steering cables connecting said axles, means whereby said cables may be adjusted to conform to the length of the reach, and means for tightening said cables whereby the reach is put under compression and all looseness or lost motion between the axles is prevented.

5. In a vehicle, a pair of axles, a reach connecting said axles, hounds on said axles and engaging said reach, diagonal steering means also connecting said axles, said means being connected to the axles at points near the ends thereof, a tongue or draft attached to one of the axles at points substantially opposite the points of attachment of the steering means whereby the draft will be transmitted directly through the said steering means to the rear axle and means for tightening said cables whereby the hounds will lift the reach at its center and cause the reach to be placed under a yielding stress.

6. In a vehicle, a pair of axles, a yielding reach connecting said axles, diagonal steering means also connecting said axles, said means being connected to the axles at points near the ends thereof, adjustable means for tightening the said steering means, whereby the said reach may be put under a yielding stress, and a tongue or draft attached to one of the axles at points substantially opposite the points of attachment of the steering means, whereby the draft will be transmitted directly through the said steering means to the rear axle.

7. In a vehicle, a pair of axles, a yielding reach connecting said axles, diagonal steering means also connecting said axles, said means being connected to the axles at points near the ends thereof, means for tightening the said steering means whereby the reach may be cambered or bowed so as to produce a stress in the connections between the axles, and a tongue or draft attached to one of the axles at points substantially opposite the points of attachment of the steering means, so that the draft will be transmitted directly through the said steering means to the rear axle.

8. In a vehicle, a pair of axles, a yielding reach connecting said axles above the centers thereof, diagonal steering cables also connecting said axles below the centers thereof, adjustable means for placing a tension upon said cables whereby the connections between the axles is put under a yielding stress, and a tongue or draft adapted to be attached to either of said axles at points substantially opposite the points of attachment of the steering cables, whereby the draft will be transmitted directly through the said cables to the rear axle.

9. In a vehicle, a pair of axles, a yielding reach connecting said axles above the centers thereof, diagonal steering cables also connecting said axles below the centers thereof, means for placing a tension upon said cables whereby the reach may be cambered or bowed so as to provide a stress in the connections between the axles, and a tongue or draft adapted to be attached to either of said axles at points substantially opposite the points of attachment of the steering cables, whereby the draft will be transmitted directly through the said cables to the rear axle.

10. In a vehicle, a pair of axles, a yielding reach connecting said axles, means whereby said reach may be adjusted in length, diagonal steering means also connecting said axles, devices for adjusting the length of said diagonal means, and turn-buckles in said diagonal means whereby the latter may be placed under tension and the reach may be caused to bow or camber for the purpose specified.

11. In a vehicle, a pair of axles, a yielding reach connecting said axles above the centers thereof, hounds rigidly connected to each of said axles and engaging with the lower side of said reach, diagonal steering cables connected with said axles below the centers thereof, means for independently adjusting the length of said diagonal cables and for placing tension upon the same, whereby the said reach is bowed or cambered for the purpose specified, and a tongue or draft attached to one of said axles below its center and in line with the said cables.

In testimony whereof, I hereunto affix my signature in the presence of two witnesses.

CHARLES E. THORP.

Witnesses:
S. E. FOUTS,
J. B. HULL.